US009139128B1

(12) United States Patent  
Lemons

(10) Patent No.: US 9,139,128 B1
(45) Date of Patent: Sep. 22, 2015

(54) ALARM CHILD CAR SEAT

(71) Applicant: Robert Lemons, Mission, TX (US)

(72) Inventor: Robert Lemons, Mission, TX (US)

(*) Notice: Subject to any disclaimer, the term of this patent is extended or adjusted under 35 U.S.C. 154(b) by 0 days.

(21) Appl. No.: 14/326,860

(22) Filed: Jul. 9, 2014

(51) Int. Cl.
*B60Q 1/00* (2006.01)
*B60N 2/26* (2006.01)
*B60R 21/015* (2006.01)
*G08B 21/22* (2006.01)

(52) U.S. Cl.
CPC .. *B60Q 1/00* (2013.01); *B60N 2/26* (2013.01); *B60R 21/01516* (2014.10); *G08B 21/22* (2013.01)

(58) Field of Classification Search
CPC ............ B60N 2/002; B60N 2/26–2/28; G08B 21/22–21/24; B60R 21/01516; B60Q 1/00
See application file for complete search history.

(56) References Cited

U.S. PATENT DOCUMENTS

| | | | | |
|---|---|---|---|---|
| 4,885,566 A * | 12/1989 | Aoki et al. | ................. | 340/457.1 |
| 5,260,684 A * | 11/1993 | Metzmaker | ................ | 340/457.1 |
| 6,998,988 B1 * | 2/2006 | Kalce | ........................ | 340/573.1 |
| 7,106,207 B1 * | 9/2006 | Marchan | ....................... | 340/667 |
| 7,218,218 B1 * | 5/2007 | Rogers | ......................... | 340/522 |
| 7,378,979 B2 | 5/2008 | Rams, Jr. | | |
| 7,567,181 B1 * | 7/2009 | Davison | ..................... | 340/573.1 |
| 7,714,737 B1 | 5/2010 | Morningstar | | |
| 8,477,024 B2 | 7/2013 | Schoenberg et al. | | |
| 8,816,839 B1 * | 8/2014 | Rick | .......................... | 340/457.1 |
| 9,030,313 B1 * | 5/2015 | Pearson | ........................ | 340/457 |
| 2002/0030601 A1 * | 3/2002 | Yano et al. | .................... | 340/667 |
| 2003/0221922 A1 * | 12/2003 | Callow | ......................... | 188/265 |
| 2004/0083550 A1 * | 5/2004 | Graebe, Jr. | ........................ | 5/654 |
| 2004/0118619 A1 * | 6/2004 | Gray et al. | .................... | 177/144 |
| 2004/0130452 A1 * | 7/2004 | Cherubini | ................. | 340/573.7 |
| 2004/0169406 A1 * | 9/2004 | Yoshida | ................... | 297/216.11 |
| 2005/0057350 A1 * | 3/2005 | Younse | ....................... | 340/457.1 |
| 2005/0194779 A1 * | 9/2005 | Ito et al. | ..................... | 280/801.1 |
| 2006/0005630 A1 * | 1/2006 | Jitsui et al. | ....................... | 73/779 |
| 2006/0064820 A1 * | 3/2006 | Call et al. | .......................... | 5/654 |
| 2006/0103516 A1 * | 5/2006 | Zang | ............................. | 340/457 |
| 2006/0273917 A1 * | 12/2006 | Rams | ........................... | 340/667 |
| 2007/0052529 A1 * | 3/2007 | Perez | ............................ | 340/457 |
| 2007/0057799 A1 * | 3/2007 | Monzo et al. | .............. | 340/573.1 |
| 2007/0182570 A1 * | 8/2007 | Overturf | .................... | 340/573.1 |
| 2008/0116725 A1 * | 5/2008 | Hawes et al. | ............... | 297/217.3 |
| 2009/0000037 A1 * | 1/2009 | Graebe, Jr. | ........................ | 5/654 |
| 2009/0033078 A1 * | 2/2009 | Hawes et al. | ................. | 280/735 |
| 2009/0212933 A1 * | 8/2009 | Salazar | ......................... | 340/457 |
| 2009/0237229 A1 * | 9/2009 | Kautz | ........................... | 340/457 |
| 2010/0253119 A1 * | 10/2010 | Nagata | ....................... | 297/216.1 |
| 2011/0205060 A1 * | 8/2011 | Taylor | ......................... | 340/573.1 |
| 2011/0248534 A1 * | 10/2011 | Pinto Ribeiro | ............. | 297/217.1 |
| 2013/0134764 A1 * | 5/2013 | Groh | ........................ | 297/452.41 |
| 2014/0246887 A1 * | 9/2014 | Clos et al. | .................. | 297/217.3 |
| 2014/0253314 A1 * | 9/2014 | Rambadt et al. | ........... | 340/457.1 |

* cited by examiner

*Primary Examiner* — Hai Phan
*Assistant Examiner* — Orlando Bousono
(74) *Attorney, Agent, or Firm* — Crossley Patent Law

(57) ABSTRACT

An alarm child car seat having a seat with a cushioned bolstered frame, a plurality of pressure sensors in the seat bottom and seat back, a reset button disposed within one seat side, a red light and green light disposed adjacent the reset button, a CPU and Bluetooth in operational communication with an existing vehicle's electronics, wherein a first alarm of the vehicle sounds within a thirty second time lapse, the pressure sensed, the ignition off, wherein a time lapse of 90 seconds initiates a second alarm, the second alarm a call from the Bluetooth to an existing cell phone, the first alarm continued, an answer of the cell phone discontinuing the first alarm and the second alarm; and wherein a time elapse of 300 seconds initiates third alarm that signals from the existing vehicle electronics to a 911 emergency service.

1 Claim, 4 Drawing Sheets

ALARM CHILD CAR SEAT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of child seat alarms are known in the prior art. Many offer on/off alarm function without various sequences of alarms and are therefore provide no gradients within which an operator can prevent false signals, especially when a signal to 911 is initiated. A sequence of elevated alarms is therefore desirable. Many current alarms do not offer an alarm reset without reinserting an ignition key, a less than desirable trait on occasion. For example, if keys are tossed into a purse prior to removing a child from a seat, then not recovered in time to reinsert into the ignition, the alarm is triggered. Most alarms and alarm seats do not then, as needed, provide an alarm reset on the seat itself, where reset is most conveniently needed. Additionally, alarms typically provide either a pressure sensing mechanism in the seat bottom, the seat back, or both, yet little children squirm around quite often and can cause malfunction by not providing sufficient pressure on sensors. What is needed is an alarm child car seat that is supplied as original equipment and interacts with existing equipment of the vehicle to progress through stages of alarms, an alarm seat ensuring correct sensing of pressure of any size child. The present alarm child car seat provides these advantages.

FIELD OF THE INVENTION

The present alarm child car seat relates to child seat alarms, and more particularly, to an alarm child car seat that that is supplied as original equipment, ensures accurate pressure sensing, and interacts with existing equipment of the vehicle to progress through stages of alarms.

SUMMARY OF THE INVENTION

The general purpose of the present alarm child car seat, described subsequently in greater detail, is to provide an alarm child car seat that has many novel features that result in an alarm child car seat which is not anticipated, rendered obvious, suggested, or even implied by prior art, either alone or in combination thereof.

To accomplish this, the alarm child car seat comprises an alarm seat comprising a bolstered frame having a seat back, a seat bottom, and a pair of spaced apart seat sides. A cushion surrounds a substantial portion of the seat back, the seat bottom, and the seat sides. A center belt fitting is disposed adjacent to the cushion in the seat bottom. A plurality of pressure sensors is provided. At least eight equally spaced apart pressure sensors is disposed throughout the seat back cushion. At least eight equally spaced apart pressure sensors are disposed throughout the seat bottom cushion.

A reset button is disposed within one seat side. A red light is disposed adjacent the reset button. A green light is disposed adjacent the reset button. An electronics case is disposed proximal the reset button. A CPU is disposed within the electronics case. The CPU is in operational communication with the reset button, the red light, and the green light. A battery is disposed within the electronics case. The battery is in operational communication with the CPU. A Bluetooth is disposed within the electronics case. The Bluetooth is in operational communication with the CPU.

The Bluetooth communicates with an existing vehicle's electronics. The CPU instructs the reset button, the red light, the green light and the Bluetooth. The green light is lit with pressure sensors to activate by a pressure with an ignition of the vehicle on. The existing vehicle electronics is in communication with the Bluetooth. A first alarm of the vehicle sounds within a 30 second time lapse if the pressure in sensed anywhere in the alarm seat by the pressure sensors and the ignition is off. A time lapse of 90 seconds initiates a second alarm. The second alarm comprises a call from the Bluetooth to an existing cell phone. The first alarm continues with the second alarm. An answer of the cell phone discontinues the first alarm and the second alarm. A time elapse of 300 seconds initiates a third alarm. The third alarm comprises a signal from the existing vehicle electronics to al emergency service. A push of the reset button restarts any of the time lapses.

The red light is on with a low battery condition so that a vehicle operator and any others may know that an empty alarm child car seat with any of the first, second, and third alarms may be a cause for an alarm malfunction and not emergency action.

The scheduled time lapses are extremely important to the function of the alarm child car seat. Time in excess of the 30 seconds for the first alarm could see a rushing vehicle operator too distant from the vehicle to discern that the alarm was in fact coming from that specific vehicle, especially since false alarms from various autos seem almost to surround us at times. Time in excess of the 90 second lapse for the second alarm might see a vehicle operator deep into a store, as example, and unable to receive a cell phone call due to oft experienced cell phone interference. And, initiating a third alarm sooner than a lapse of 300 seconds might see a 911 emergency service contacted prematurely and potentially thereby not capable of responding to an authentic call if the first is inaccurate.

Thus has been broadly outlined the more important features of the present alarm child car seat so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
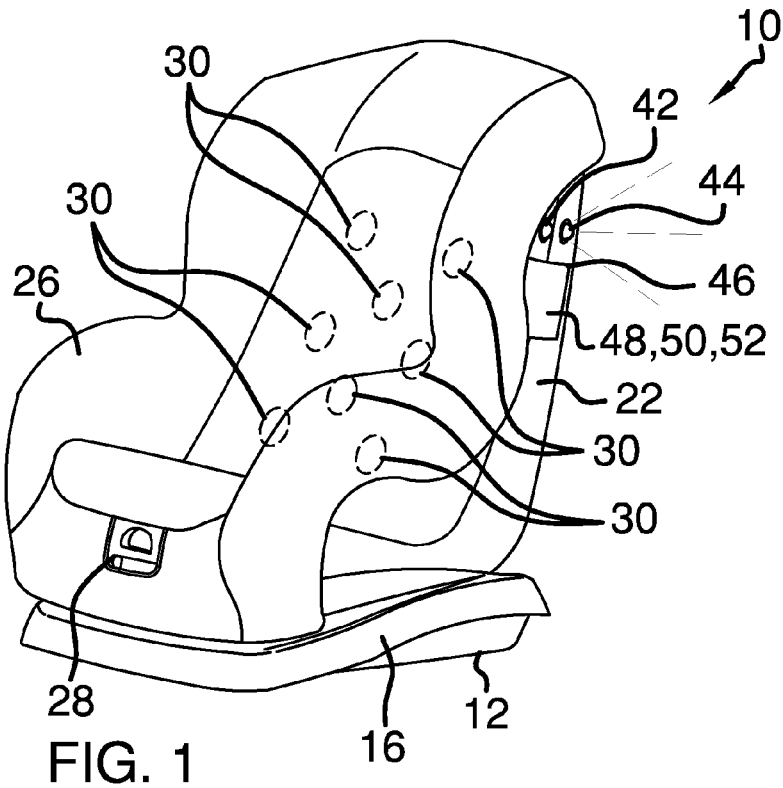
FIG. 1 is a perspective view.
Figure 2:
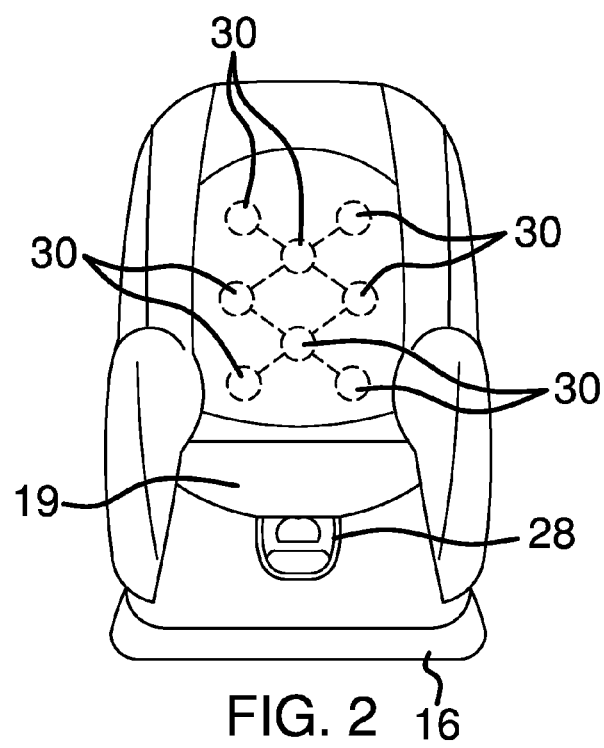
FIG. 2 is a front elevation view.
Figure 3:
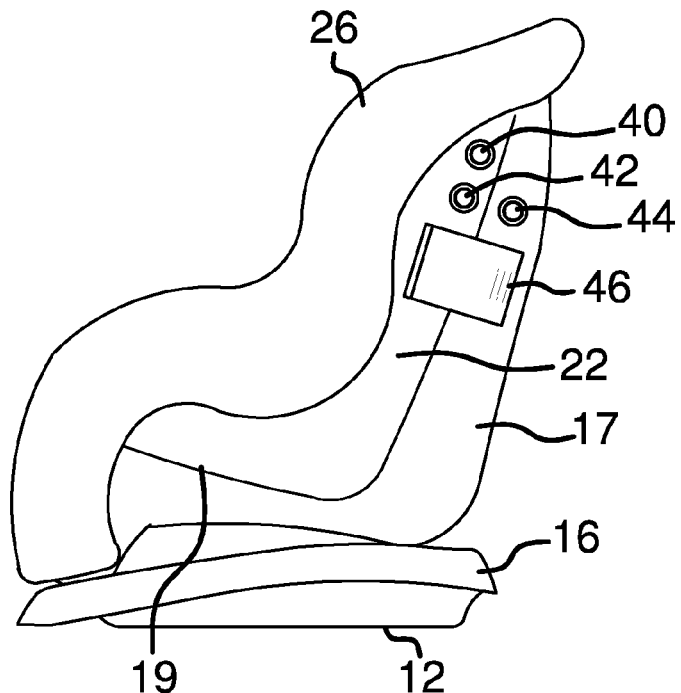
FIG. 3 is a lateral elevation view.
Figure 4:
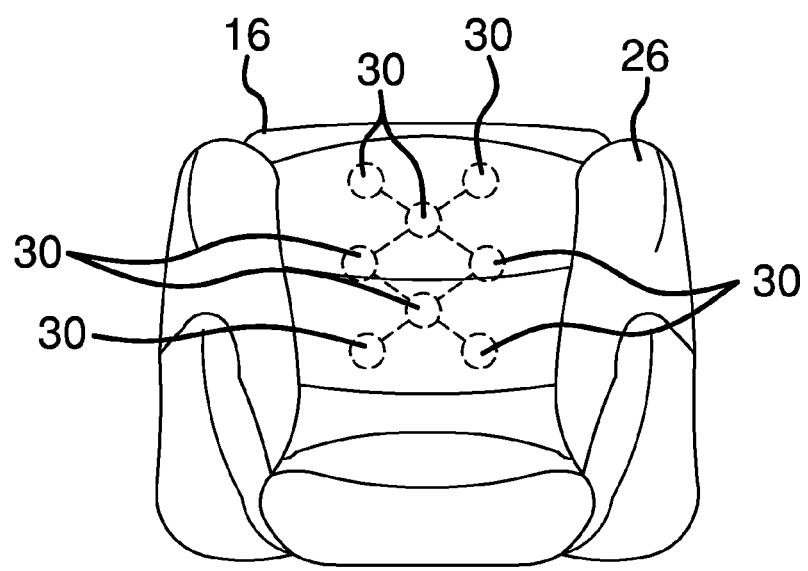
FIG. 4 is a top plan view.
Figure 5:
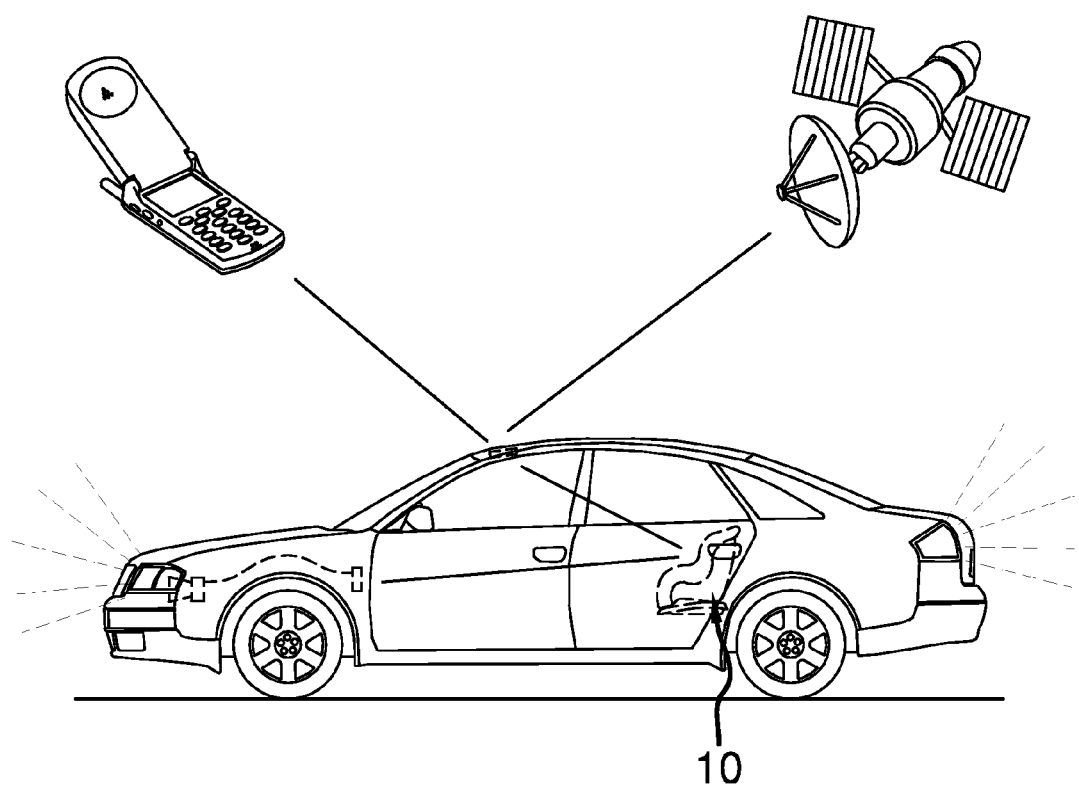
FIG. 5 is an installed view.
Figure 6:
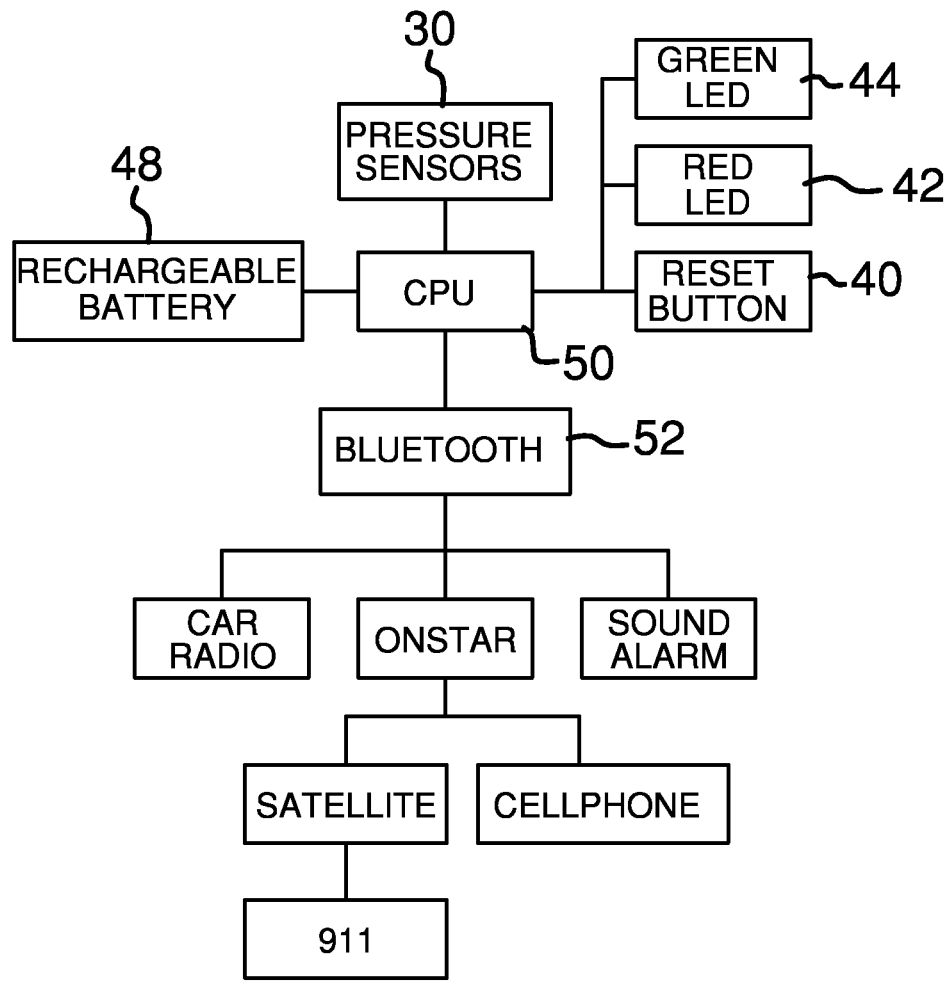
FIG. 6 is a schematic block diagram of cooperation between an alarm child car seat and an existing vehicle.

With reference now to the drawings, and in particular FIGS. 1 through 5 thereof, an example of the alarm child car seat employing the principles and concepts of the present alarm child car seat and generally designated by the reference number 10 will be described.

Referring to FIGS. 1 through 5, the alarm child car seat 10 is illustrated. The alarm child car seat 10 comprises an alarm seat 12 comprising a bolstered frame 16 having a seat back 17, a seat bottom 19, and a pair of spaced apart seat sides 22. A cushion 26 surrounds a substantial portion of the seat back 17, the seat bottom 19, and the seat sides 22. A center belt fitting 28 is disposed adjacent to the cushion 26 in the seat bottom 19. A plurality of pressure sensors 30 is provided. At least eight equally spaced apart pressure sensors 30 is disposed throughout the seat back 17 cushion 26. At least eight equally spaced apart pressure sensors 30 are disposed throughout the seat bottom 19 cushion 26.

A reset button 40 is disposed within one seat side 22. A red light 42 is disposed adjacent the reset button 40. A green light 44 is disposed adjacent the reset button 40. An electronics case 46 is disposed proximal the reset button 40. A CPU 50. is disposed within the electronics case 46. The CPU 50 is in operational communication with the reset button 40, the red light 42, and the green light 44. A battery 48 is disposed within the electronics case 46. The battery 48 is in operational communication with the CPU 50. A Bluetooth 52 is disposed within the electronics case 46. The Bluetooth 52 is in operational communication with the CPU 50.

The Bluetooth 52 communicates with an existing vehicle's electronics. The CPU instructs the reset button 40, the red light 42, the green light 44 and the Bluetooth 52. The green light 44 is lit with pressure sensors 30 to activate by a pressure with an ignition of the vehicle on. The existing vehicle electronics is in communication with the Bluetooth 52. A first alarm of the vehicle sounds within a 30 second time lapse if the pressure in sensed anywhere in the alarm seat 12 by the pressure sensors 30 and the ignition is off. A time lapse of 90 seconds initiates a second alarm. The second alarm comprises a call from the Bluetooth 52 to an existing cell phone. The first alarm continues with the second alarm. An answer of the cell phone discontinues the first alarm and the second alarm. A time elapse of 300 seconds initiates a third alarm. The third alarm comprises a signal from the existing vehicle electronics to a 911 emergency service. A push of the reset button restarts any of the time lapses.

The red light 42 is on with a low battery 48 condition so that a vehicle operator and any others may know that an empty alarm child car seat 10 with any of the first, second, and third alarms may be a cause for an alarm malfunction.

What is claimed is:

1. An alarm child car seat comprising:

an alarm seat comprising a bolstered frame having a seat back, a seat bottom, and a pair of spaced apart seat sides;

a cushion surrounding a substantial portion of the seat back, the seat bottom, and the seat sides;

a center belt fitting disposed adjacent to the cushion in the seat bottom;

a plurality of pressure sensors, wherein the plurality of pressure sensors comprises at least eight equally spaced apart pressure sensors disposed throughout the seat back cushion and at least eight equally spaced apart pressure sensors disposed throughout the seat bottom cushion;

a reset button disposed within one seat side;

a red light disposed adjacent the reset button;

a green light disposed adjacent the reset button;

an electronics case disposed proximal the reset button;

a central processing unit (CPU) disposed within the electronics case, the CPU in operational communication with the reset button, the red light, and the green light;

a battery disposed within the electronics case, the battery in operational communication with the CPU; and a Bluetooth module disposed within the electronics case, the Bluetooth module in operational communication with the CPU;

wherein the Bluetooth module communicates with an existing vehicle's electronics;

wherein the green light is lit with the plurality of pressure sensors activated by a pressure with an ignition of the vehicle on;

wherein the red light is on with a low battery condition;

wherein a first alarm of the vehicle sounds within a thirty second time lapse of a time lapse cycle while the pressure is sensed and the ignition off;

wherein a time lapse of 90 seconds of the time lapse cycle initiates a second alarm, the second alarm comprising a call from the Bluetooth module to an existing cell phone while the first alarm is continued;

wherein an answer of the cell phone discontinues the first alarm and the second alarm;

wherein a time lapse of 300 seconds of the time lapse cycle initiates a third alarm, the third alarm comprising a signal from the existing vehicle's electronics to a 911 emergency service; and wherein a push of the reset button restarts the time lapse cycle.

* * * * *